United States Patent Office 3,314,948
Patented Apr. 18, 1967

3,314,948
HETEROCYCLIC COMPOUNDS
Jany Renz, Jean-Pierre Bourquin, and Hans Winkler, Basel, Conrad Brüschweiler, Birsfelden, Basel-Land, and Gustav Schwarb, Neu-Allschwil, Basel-Land, Switzerland, assignors to Sandoz Ltd. (also known as Sandoz A.G.), Basel, Switzerland
No Drawing. Filed July 17, 1963, Ser. No. 295,836
Claims priority, application Switzerland, July 19, 1962, 8,708/62, 8,709/62; Oct. 23, 1962, 12,407/62, 12,408/62
3 Claims. (Cl. 260—243)

The present invention relates to new phenothiazine derivatives, their acid addition salts, and pharmaceutical compositions containing as an essential active ingredient said phenothiazine derivative or a non-toxic pharmaceutically acceptable acid addition salt in an inert carrier or vehicle prepared in unit dosage form.

The present invention provides compounds of the formula:

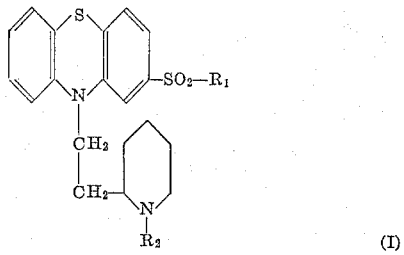

in which each of $R_1$ and $R_2$ is a lower alkyl radical, their acid addition salts and pharmaceutical compositions containing, in addition to an inert carrier, a compound I and/or an acid addition salt thereof.

The production of compounds I and their acid addition salts is carried out by cyclizing a compound of the formula:

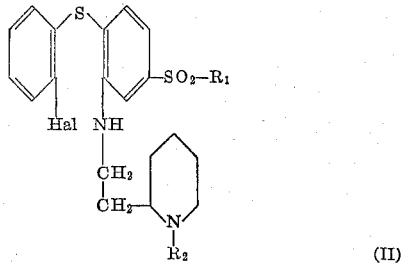

in which $R_1$ and $R_2$ have the above significance and Hal is chlorine, bromine or iodine, and, when an acid addition salt is required, salification is effected in a manner known per se.

Suitable acids for the salification are, for example, hydrochloric, hydrobromic, sulfuric, citric, tartaric, succinic, maleic, malic, acetic, benzoic, hexahydrobenzoic, methanesulfonic, fumaric, gallic and hydriodic acid. The term "known" as used herein designates a method described in the literature on the subject or in actual use.

The process is carried out, for example, by heating for a prolonged period a diphenyl sulfide derivative of Formula II in a suitable solvent, e.g. dichlorobenzene, decalin or dimethyl formamide, after adding an alkaline condensation agent, e.g. an alkali metal carbonate or alkali metal hydroxide, and, if desired, a small amount of copper powder. When reaction is complete, filtration is effected and the filtrate, when the solvent used is immiscible with water, is extracted directly with a dilute mineral or organic acid. When the solvent used is miscible with water, this latter is first removed by evaporation in a vacuum, the residue is dissolved in a solvent which is immiscible with water and only then extracted with acid. The compounds I are separated from the acid extract by adding a caustic alkali solution or ammonia and, if they are precipitated in solid form, they are filtered, otherwise they are taken up in benzene or other solvent which is immiscible with water and then freed from the solvent by evaporation. The bases may be purified by crystallization from a suitable solvent or purified by distillation in a high vacuum and converted into a suitable salt with organic or inorganic acids or with 8-chlorotheophylline.

The compounds I and their salts with pharmaceutically tolerable organic or inorganic acids potentiate the effect of narcotically, hypnotically or analgesically active drugs. As a consequence of this, they have a neuroplegic and sedative action in psychic diseases and may also be used for narcosis preparation. The compounds I and their salts with pharmaceutically tolerable organic or inorganic acids also have cataleptic properties, for which reason they can be used in psychiatry for the treatment of motor excitation conditions.

The production of compounds II, which are also new, is carried out by condensation of a compound of the formula:

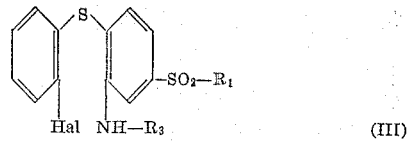

in which Hal and $R_1$ have the above significance, and $R_3$ is hydrogen or a lower acyl radical, with a piperidine derivative of the formula:

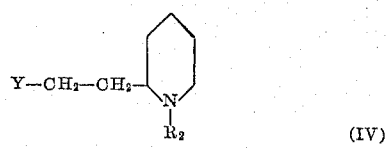

in which $R_2$ has the above significance, and Y is chlorine or bromine, and splitting off hydrolytically and acyl radical present.

This condensation may be effected by heating in a suitable organic solvent in the presence of an alkaline condensation agent. Upon completion of the reaction, the reaction mixture is shaken out with water and the organic solution extracted with a dilute mineral or organic acid. The base is separated from the aqueous phase by adding a caustic alkali solution or ammonia. After taking upon the precipitated base in a solvent which is immiscible with water, e.g. benzene, and evaporating the solvent under reduced pressure, the base is purified by crystallization or by distillation in a high vacuum and converted, if desired, into a salt with a suitable inorganic or organic acid. When a substance III is used, in which $R_3$ is a lower acyl radical, the condensation product must be deacylated before further reaction, if deacylation has not already taken place during condensation; this may be effected by boiling with an aqueous mineral acid or with an alkali metal hydroxide in a higher alcohol.

When an acid addition salt of a compound II is required, salification is effected in a manner known per se. Suitable acids for the salification are, for example, hydrochloric, hydrobromic, sulfuric, citric, tartaric, succinic, maleic, malic, acetic, benzoic, hexahydrobenzoic, methanesulfonic, fumaric, gallic and hydriodic acid. The term "known" as used herein designates a method described in the literature on the subject or in actual use.

The compounds II are not only useful as starting material for the preparation of compounds I, but possess also, as well as their acid addition salts with pharmaceutically tolerable organic or inorganic acids, a strong spasmolytic action.

The compounds I as well as the compounds II may be worked up in the form of pharmaceutical preparations. These contain the compound of the invention in admixture with an organic or inorganic carrier which is suitable for enteral, parenteral or local application and which does not react with the compounds I, e.g. gelatine, lactose, starch, magnesium stearate, talc, vegetable oils, benzyl alcohols, gum arabic, polyalkylene glycols, petroleum jelly, cholesterol or other known pharmaceutical carriers. The pharmaceutical preparations may, for example, be in the form of tablets, dragées, powders, creams, suppositories or in liquid form as solutions, suspensions or emulsions; they may, if desired, be sterilized and/or contain adjuvants such as preserving agents, stabilizers, wetting agents or emulsifiers, or other therapeutically active substances.

The invention thus further provides pharmaceutical preparations containing, in addition to an inert carrier, a compound I or a compound II respectively or an acid addition salt or quaternary ammonium compound thereof.

In the following non-limitative examples, all temperatures are indicated in degrees centigrade. Melting points are corrected.

EXAMPLE 1.—*3-methylsulphonyl - 10-[2'-(1''-methylpiperidyl-2'')-ethyl-1']-phenthiazine*

(a) 2-bromo-2'-[2''-(1'''-methyl-piperidyl-2''')-ethyl-1'']-amino-4'-methylsulphonyl-diphenylsulphide 50.0 g. of 2-bromo-2'-acetamino - 4'-methylsulphonyl-diphenylsulphide (M.P. 151–153°, produced by acetylation of 2-bromo-2'-amino - 4'-methylsulphonyl-diphenylsulphide, M.P. 125–127°) and 5.85 g. of finely powdered sodamide in 200 cc. of absolute xylene are heated to boiling under reflux while stirring for one hour at an oil bath temperature of 180°. Without interrupting heating, a solution of 22.1 g. of 2-(1'-methyl-piperidyl-2')-1-chloroethane in 25 cc. of absolute xylene is added dropwise. After heating for a further 5 hours, the reaction mixture is cooled and shaken out three times with 25 cc. of water, after adding 10 g. of ammonium chloride. The xylene solution is extracted with 450 cc. of 15% aqueous tartaric acid, the tartaric acid extract washed with 150 cc. of benzene and rendered alkaline to phenolphthalein with 110 cc. of concentrated sodium hydroxide solution. The oily base which separates is taken up in a total of 300 cc. of benzene, the benzene extract washed out with 75 cc. of water, dried over potassium carbonate, filtered and reduced in volume by evaporation under reduced pressure. 12.6 g. of the residue after evaporation are dissolved in 65 cc. of absolute alcohol and ethanolic hydrogen chloride added until a congo-acid reaction is obtained. After twice recrystallizing from absolute ethanol, the pure 2-bromo-2'-[2''-(1'''-methyl-piperidyl-2''')-ethyl-1'']-acetamino - 4'-methylsulphonyl - diphenylsulphide hydrochloride showing a constant melting point at 188–190° is obtained.

A solution of 51.3 g. of 2-bromo-2'-[2''-(1'''-methyl-piperidyl - 2''')-ethyl-1'']-acetamino - 4'-methylsulphonyl-diphenylsulphide hydrochloride in 480 cc. of 18% aqueous hydrochloric acid is boiled under reflux for 6 hours at an oil-bath temperature of 160°. After cooling, approximately 250 cc. of concentrated sodium hydroxide solution are added until a phenolphthalein alkaline reaction is obtained and the base which separates is extracted with 300 cc. of benzene. The benzene solution is washed with 100 cc. of water, dried over potash, filtered and reduced in volume by evaporation. After twice recrystallizing the residue from acetone, pure 2-bromo-2'-[2''-(1'''-methyl-piperidyl-2''')-ethyl-1''] amino-4'-methylsulphonyl-diphenylsulphide is obtained, having a constant melting point of 123–125°.

(b) 3-methylsulphonyl-10-[2'-(1''-methyl-piperidyl-2'')-ethyl-1']-phenthiazine

A mixture of 20.0 g. of 2-bromo-2'-[2''-(1'''-methyl-piperidyl - 2''')-ethyl-1'']-amino - 4'-methylsulphonyl-diphenylsulphide (M.P. 123–125°), 11.4 g. of finely powered potassium carbonate, 0.75 g. of copper powder and 200 cc. of dimethyl-formamide is heated to boiling under reflux for 48 hours, while stirring, at an oil bath temperature of 210°. After cooling, filtration is carried out and the filtrate is freed of solvent in a vacuum. The residue left after evaporation is dissolved in 200 cc. of benzene and shaken out with 100 cc. of 15% aqueous tartaric acid. After washing out the tartaric acid extract with 75 cc. of benzene, 25 cc. of concentrated sodium hydroxide solution are added until a phenolphthalein alkaline reaction is obtained, the base which separates is taken up in 150 cc. of benzene, the benzene extract washed with 75 cc. of water, dried over potassium carbonate, filtered and reduced in volume by evaporation. After crystallizing the residue three times from acetone and adding petroleum ether, the pure 3-methyl-sulphonyl-10-[2'-(1''-methyl-piperidyl - 2'')-ethyl - 1']-phenthiazine is obtained, having a melting point of 121–123°.

EXAMPLE 2.—*3-ethylsulphonyl - 10-[2'-(1''-methyl-piperidyl-2'')-ethyl-1']-phenthiazine*

(a) 2-chloro-2'-[2''-(1'''-methyl-piperidyl-2''')-ethyl-1'']-amino-4'-ethylsulphonyl-diphenylsulphide A solution of 328 g. of 2-chloro-2'-amino-4'-ethylsulphonyl-diphenylsulphide and 186 g. of 2-(1'-methyl-piperidyl-2')-1-chloroethane in 2000 cc. of toluene is heated to boiling under reflux, while stirring, with water separator, at an oil bath temperature of 150° and 168 g. of finely powdered potassium hydroxide added in portions to the boiling solution during the course of 1½ hours. After a further 5 hours boiling, the reaction mixture is cooled, washed with 750 cc. of water and the basic substances extracted with 1400 cc. of 15% aqueous tartaric acid. After washing out the tartaric acid extract with 500 cc. of benzene, this is rendered alkaline to phenolphthalein with approximately 350 cc. of concentrated sodium hydroxide solution and the precipitated base taken up in 1500 cc. of benzene, the benzene phase washed with 500 cc. of water and reduced in volume by evaporation and the residue crystallized from 750 cc. of acetone. After crystallizing once more from acetone, analytically pure 2-chloro - 2'-[2''-(1'''-methyl-piperidyl - 2''')-ethyl-1'']-amino - 4'-ethylsulphonyl-diphenylsulphide is obtained, having a constant melting point of 110–112°.

The 2-chloro-2'-amino - 4'-ethylsulphonyl-diphenylsulphide used as starting material may be produced as follows: p,p'-dichloro-diphenyl-disulphide is split with sodium sulphide and the resulting p-chlorothiophenol converted into p-ethylmercapto-chlorobenzene (B.P. 109–112°/12 mm. Hg) by alkylation with diethyl sulphate. The p-ethylmercapto-chlorobenzene is oxidized with hydrogen peroxide in glacial acetic acid to give p-ethylsulphonyl-chlorobenzene (M.P. 37–39°) and then nitrified. The resulting 2-chloro - 5-ethylsulphonyl-nitrobenzene (M.P. 98–100°) is condensed with the sodium salt of o-chlorothiophenol to give 2-chloro-2'-nitro-4'-ethylsulphonyl-diphenylsulphide (M.P. 144–146°) and this compound reduced with iron and hydrochloric acid to 2-chloro-2'-amino-4'-ethylsulphonyl-diphenylsulphide.

(b) 3-ethylsulphonyl-10[2'-(1''-methyl-piperidyl-2'')-ethyl-1']-phenthiazine

A mixture of 100 g. of 2-chloro-2'-[2''-(1'''-methyl-piperidyl-2''')-ethyl-1'']-amino - 4'-ethylsulphonyl-diphenyl-sulphide (M.P. 110–112°), 30.5 g. of finely powdered potassium carbonate, 4 g. of copper powder and 1000 cc. of dimethylformamide is heated to boiling under reflux while stirring for 15 hours at an oil bath temperature of 210°. After cooling, filtration is effected and the filtrate freed of solvent in a vacuum. The residue left after evaporation is dissolved in 400 cc. of benzene and shaken out with 400 cc. of 15% aqueous tartaric acid. After washing the tartaric acid extract with 200 cc. of benzene, 100 cc. of concentrated sodium hydroxide solution are added to this until a phenolphthalein-alkaline reaction is obtained, the precipitated base is taken up in 500 cc. of benzene, the benzene extract washed with 200 cc. of water, dried over potassium carbonate, filtered and reduced in volume. After crystallizing the residue three times from acetone, pure 3-ethylsulphonyl-10-[2'-(1''-methyl-piperidyl-2'')-ethyl-1']-phenthiazine of M.P. 105–107° is obtained.

*Benzenesulphonate.*—14.0 g. of the base and 5.85 g. of benzene-sulphonic acid are dissolved in 60 cc. of absolute ethanol, while boiling and the solution is then cooled. The salt which crystallizes out is crystallized from 60 cc. of absolute ethanol, whereupon the pure 3-ethylsulphonyl-10-[2'-(1''-methyl-piperidyl - 2'')-ethyl-1']-phenthiazine-benzene sulphonate is obtained, having a melting point of 147–149°.

What is claimed is:
1. A compound selected from the group consisting of the compound of the formula:

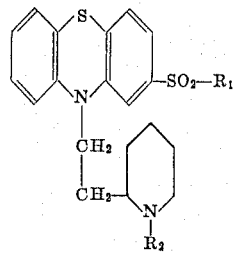

in which each of $R_1$ and $R_2$ is a lower alkyl radical, and the acid addition salt of said phenothiazine with an acid selected from the group consisting of non-toxic, pharmaceutically acceptable organic acid and inorganic acid.

2. 3-methylsulfonyl - 10-[2'-(1''-methylpiperidyl-2'')-ethyl-1']-phenothiazine.

3. 3-ethylsulfonyl - 10-[2'-(1''-methylpiperidyl - 2'')-ethyl-1']-phenothiazine.

References Cited by the Examiner
UNITED STATES PATENTS 3,084,161    4/1963    Renz et al. _____ 260—243

FOREIGN PATENTS 556,474    10/1957    Belgium.
556,725    10/1957    Belgium.

JOHN D. RANDOLPH, *Primary Examiner.*
WALTER A. MODANCE, *Examiner.*
HARRY I. MOATZ, *Assistant Examiner.*